(12) United States Patent
Stefanovic

(10) Patent No.: US 11,261,740 B2
(45) Date of Patent: Mar. 1, 2022

(54) BALANCING SYSTEMS AND METHODS FOR AN ENGINE OF AN AIRCRAFT

(71) Applicant: THE BOEING COMPANY, Chicago, IL (US)

(72) Inventor: Milan Stefanovic, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 210 days.

(21) Appl. No.: 16/732,580

(22) Filed: Jan. 2, 2020

(65) Prior Publication Data

US 2021/0207485 A1 Jul. 8, 2021

(51) Int. Cl.
*F01D 5/26* (2006.01)
*F01D 25/06* (2006.01)

(52) U.S. Cl.
CPC .............. *F01D 5/26* (2013.01); *F01D 25/06* (2013.01); *F05D 2240/242* (2013.01)

(58) Field of Classification Search
CPC . F01D 5/26; F01D 5/027; F01D 25/06; F05D 2240/242
See application file for complete search history.

(56) References Cited

U.S. PATENT DOCUMENTS

| 5,005,353 A | * | 4/1991 | Acton | F01D 17/02 60/39.281 |
|---|---|---|---|---|
| 2002/0069637 A1 | * | 6/2002 | Becquerelle | F02C 7/36 60/226.1 |
| 2017/0058697 A1 | | 3/2017 | Copeland | |
| 2018/0128342 A1 | * | 5/2018 | Ghosh | F16C 27/045 |
| 2019/0292923 A1 | * | 9/2019 | MacMahon | F01D 25/06 |

FOREIGN PATENT DOCUMENTS

| CN | 209398455 | | 9/2019 | |
| GB | 2319812 A | * | 6/1998 | ............. F16K 13/06 |
| WO | WO 2014/164426 | | 10/2014 | |

OTHER PUBLICATIONS

Extended European Search Report for EP 20203568.9-1004, dated Apr. 23, 2021.

* cited by examiner

*Primary Examiner* — Juan G Flores
*Assistant Examiner* — Joshua R Beebe
(74) *Attorney, Agent, or Firm* — The Small Patent Law Group LLC; Joseph M. Butscher

(57) ABSTRACT

A balancing system and method for an engine of an aircraft includes a housing retaining a magnetorheological fluid including magnetic particles within a carrier fluid. Electromagnets are coupled to the housing. The electromagnets are associated with fan blades of the engine. A balancing control unit is in communication with the electromagnets and sensors of the fan blades.

25 Claims, 4 Drawing Sheets

BALANCING SYSTEMS AND METHODS FOR AN ENGINE OF AN AIRCRAFT

FIELD OF THE DISCLOSURE

Embodiments of the present disclosure generally relate to systems and methods for mitigating engine imbalance, such as within an engine of an aircraft.

BACKGROUND OF THE DISCLOSURE

Various aircraft include propulsion systems, such as two or more engines. For example, the engines are turbofan engines that include a plurality of fan blades coupled to an engine core.

The engines typically include gas turbine engine fan blade containment (GTEFBC) systems. During operation, a fan blade may dislodge or otherwise break (that is, a fan blade out event). In such an event, a GTEFBC system prevents a portion of the fan blade from being ejected through the fan casing of the engine.

During a fan blade out event, the engine may become imbalanced. In particular, a fragmented portion of a fan blade may cause a mass imbalance within the engine, as the mass of the fragmented portion may no longer be present within the engine, and/or may not be located where intended. Accordingly, the engine may oscillate or vibrate due to the mass imbalance. The oscillation or vibration of the engine may, in turn, be translated to other portions of the aircraft, such as a wing to which the engine is secured.

SUMMARY OF THE DISCLOSURE

A need exists for a system and a method for maintaining mass balance within an engine of an aircraft. Further, a need exists for a system and a method for maintaining engine balance in the event a fan blade fragments during operation of the engine.

With those needs, in mind, certain embodiments of the present disclosure provide a balancing system for an engine of an aircraft. The balancing system includes a housing retaining a magnetorheological fluid including magnetic particles within a carrier fluid. Electromagnets are coupled to the housing. The electromagnets are associated with fan blades of the engine. A balancing control unit is in communication with the electromagnets and sensors of the fan blades.

In at least one embodiment, the balancing control unit is configured to receive presence signals from the sensors of the fan blades, maintain the electromagnets in deactivated states when the presence signals from the sensors of all the fan blades are detected, and activate one or more of the electromagnets when one or more of the presence signals are not detected. The one or more electromagnets that are activated attract the magnetic particles to compensate for missing mass of at least one of the fan blades.

In at least one embodiment, the housing is formed as a torus defining an interior tubular chamber that retains the magnetorheological fluid. As an example, a mass of the magnetic particles is equal to a mass of at least one of the fan blades. A number of electromagnets corresponds to a number of the fan blades. The electromagnets are radially aligned with the fan blades. Each of the electromagnets is radially aligned with a respective one of the fan blades. The housing is configured to rotate at the same angular velocity as the fan blades so that a radial alignment between the fan blades and the electromagnets is maintained. In at least one embodiment, an actuator is operatively coupled to the housing. The actuator rotates the housing. As an example, the actuator includes an electric motor.

Certain embodiments of the present disclosure provide a balancing method for an engine of an aircraft. The balancing method includes retaining, within a housing, a magnetorheological fluid including magnetic particles within a carrier fluid, coupling electromagnets to the housing, associating the electromagnets with fan blades of the engine, and communicatively coupling a balancing control unit with the electromagnets and sensors of the fan blades.

In at least one embodiment, the balancing method also includes receiving, by the balancing control unit, presence signals from the sensors of the fan blades, maintaining the electromagnets in deactivated states when the presence signals from the sensors of all the fan blades are detected, activating one or more of the electromagnets when one or more of the presence signals are not detected, and attracting, by the one or more electromagnets that are activated, the magnetic particles to compensate for missing mass of at least one of the fan blades.

Certain embodiments of the present disclosure provide an aircraft including an engine including fan blades. Each of the fan blades includes a sensor. The aircraft also includes a balancing system, as described herein.

DETAILED DESCRIPTION OF THE DISCLOSURE

Figure 1:
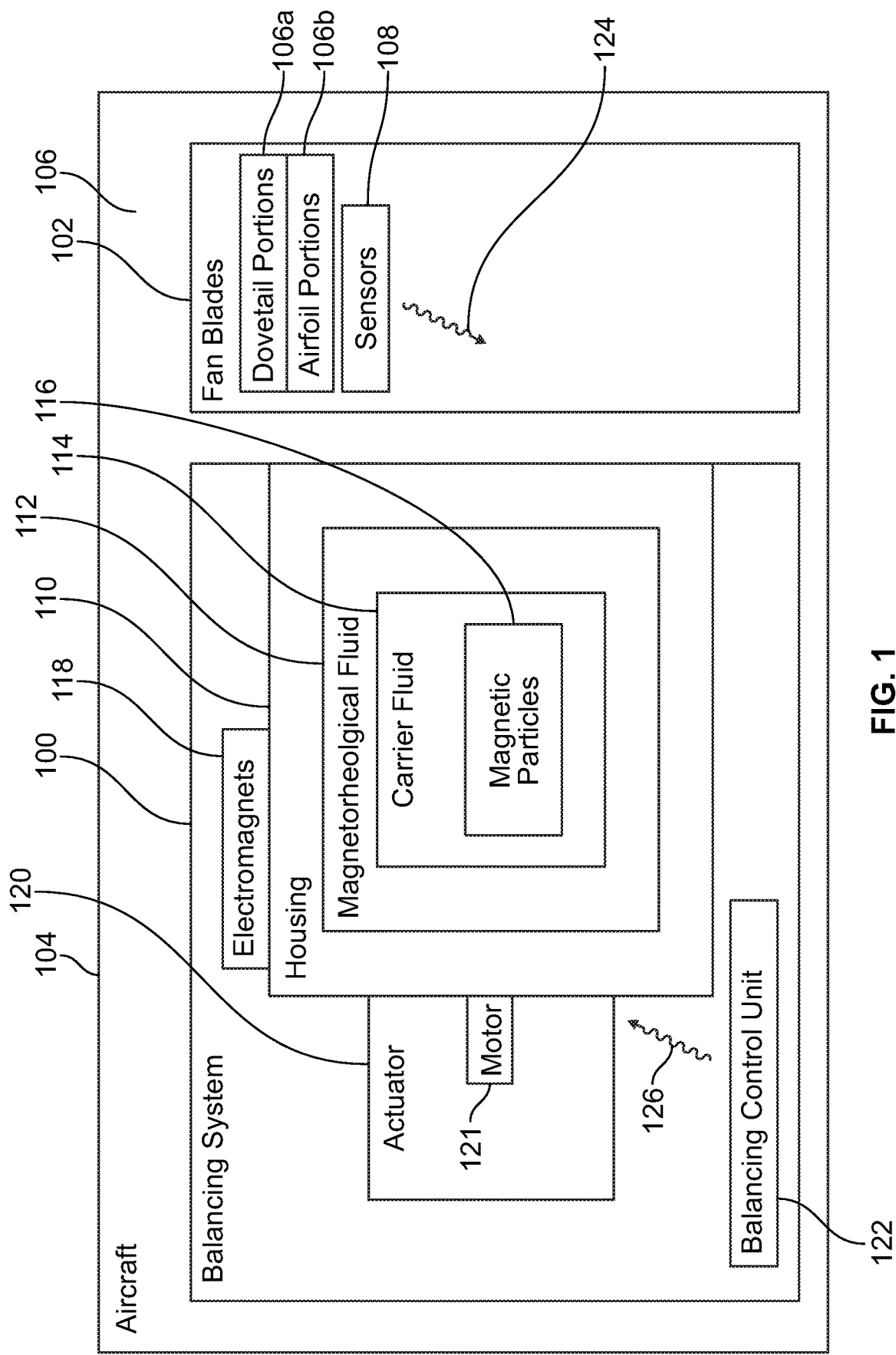
FIG. 1 is a schematic block diagram of a balancing system for an engine of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a balancing system for an engine of an aircraft. The balancing system is configured to compensate for an engine imbalance that occurs when a fan blade out event occurs. In at least one embodiment, the balancing system includes a housing, such as formed as a torus that contains a magnetorheological fluid. When a fan blade out event occurs, an electromagnet proximate the missing fan blade is activated (such as through electrical activation), thereby causing magnetic particles within the fluid to be drawn to the radial location of the missing fan blade.

Certain embodiments of the present disclosure provide a system for mitigating an engine imbalance. The system includes a housing formed as a torus that retains a magnetorheological fluid. A plurality of electromagnets are coupled to an external surface of the housing. A balancing control unit is in communication with the electromagnets. The balancing control unit is configured to identify a fan blade out event (such as via sensors coupled to the fan blades), and activate at least one of the electromagnets disposed adjacent to the identified blade out event, thereby attracting magnetic particles within the fluid to compensate for the mass of the missing fan blade.

In at least one embodiment, the engine includes a fan. Rotation of the housing of the proposed device is coupled to rotation of the fan. The fan and the housing are configured to rotate at the same rotational speed. The fan includes n blades and the housing include n electromagnets that correspond to the n blades. In at least one embodiment, a mass of the magnetic particles within the magnetorheological fluid is equal to a mass of a single fan blade.

In at least one embodiment, the system also includes a plurality of sensors. Each fan blade includes at least one of the plurality of sensors. The balancing control unit is configured to receive an input from each of the plurality of sensors, and identify the fan blade out event based upon the received inputs.

In at least one embodiment, a shaft is coupled between the engine and the housing. The shaft is configured to rotate the housing at the same rotational speed as the engine. As another example, the system includes a motor that rotates the housing at the same rotational speed as the engine fan. The viscosity of the magnetorheological fluid inside the device housing assures that the magnetic particles rotate inside the housing at the same radial velocity as the fan blades.

FIG. 1 is a schematic block diagram of a balancing system 100 for an engine 102 of an aircraft 104, according to an embodiment of the present disclosure. The aircraft 104 may include more than one engine 102. The engine 102 includes a plurality of fan blades 106. In an exemplary embodiment, each fan 106 includes a dovetail portion 106a that is formed unitarily with an airfoil portion 106b.

In at least one embodiment, sensors 108 are coupled to the fan blades 106. For example, each fan blade 106 may include a sensor 108. As an example, a sensor 108 may be embedded within an airfoil portion 106b of a fan blade 106. As another example, a sensor is 108 secured to an outer surface of an airfoil portion 106b of a fan blade 106. In at least one embodiment, the sensor 108 is a current-sensing wire. As another example, the sensor 108 is a voltage-sensing wire. The sensors 108 output presence signals that indicate the presence of the fan blades within the engine 102. For example, when the fan blade 106 is operationally secured within the engine 102, a sensor 108 of the fan blade 106 detects a current or voltage and outputs a corresponding signal that indicates the presence of the fan blade 106 within the engine 102. In the event of a fan blade out event, the sensor 108 no longer detects a current or voltage, and therefore no longer outputs a presence signal.

The balancing system 100 includes a housing 110, which may be formed of a torus. The housing 110 retains a magnetorheological fluid 112. The magnetorheological fluid 112 includes a carrier fluid 114, such as an oil, and magnetic particles 116 within the carrier fluid 114. The magnetic particles 116 may be spheres, ellipsoids, or the like that are suspended within the carrier fluid 114. In at least one embodiment, the mass of the magnetic particles 116 is equal to a mass of an airfoil portion 106b of one fan blade 106. As explained herein, in the event of a fan blade out event, the magnetic particles 116 are drawn to the location of a missing fan blade 106 (such as a missing airfoil portion 106b of the fan blade 106), thereby compensating for the lost mass of the airfoil portion 106b of the fan blade 106 and maintaining balance of mass within the engine 102.

In at least one other embodiment, the mass of the magnetic particles 116 is equal to the mass of one and a half airfoil portions 106b. It has been found through testing that when one fan blade 106 fragments from the engine 102, a half of another fan blade 106 may also fragment from the engine 102. In at least one other embodiment, the mass of the magnetic particles 116 may be greater or less than one airfoil portion 106b, or one and a half airfoil portions 106.

Electromagnets 118 are coupled to an exterior of the housing 110. In at least one embodiment, the electromagnets 118 correspond to the number of fan blades 106 of the engine 102. The electromagnets 118 are configured to be selectively deactivated (such as through no electrical current flowing thereto), and activated (such as through electrical current flowing thereto). The electromagnets 118 are radially aligned with the fan blades 106. That is, each electromagnet 118 is radially aligned with an associated fan blade 106. The housing 110 is configured to rotate at the same angular velocity as the fan blades 106 so that the radial alignment between the fan blades 106 and the electromagnets 118 is maintained.

As such, an actuator 120 is operatively coupled to the housing 110. In at least one embodiment, the actuator 120 is a motor or engine that rotates the housing 110 along with the engine 102 to maintain the radial alignment between the electromagnets 118 and the associated fan blades 106. As an example, the actuator 120 is an electric motor. It has been found that an electric motor provides a relatively light actuator as compared to mechanical linkages. As such, the electric motor may add less weight to the aircraft 104 than complex mechanical linkages, thereby increasing fuel economy of the aircraft 104. As another example, the actuator 120 is a linkage that mechanically links the rotation of the fan blades 106 to the rotation of the housing 110. In such an embodiment, the linkage may be or include a shaft that is coupled between the engine 102 and the housing 110, such as through an accessory gearbox, connecting brackets, spars, ribs, fasteners, and/or the like, such that rotation of the engine 102 also results in rotation of the housing 110.

The balancing system 100 also includes a balancing control unit 122, which may be onboard the aircraft 104. For example, the balancing control unit 122 may be coupled to the engine 102 or proximate to the engine 102. As another example, the balancing control unit 122 may be within a flight deck of the aircraft 104. The balancing control unit 122 is in communication with the electromagnets 118 and the sensors 108, such as through wireless connections.

In operation, housing 110 is rotated along with the fan blades 106 via the actuator 120 so that the electromagnets 118 maintain radial alignment with associated fan blades 106. During this time, the balancing control unit 122 receives the presence signals 124 from the sensors 108 of the fan blades 106. The balancing control unit 122 detects the presence of all the fan blades 106 through the presence signals 124. If the balancing control unit 122 detects all the presence signals 124 from all the sensors 108 of the fan blades 106, the balancing control unit 122 refrains from activating any of the electromagnets 118. That is, the balancing control unit 122 maintains the electromagnets 118 in a deactivated state.

If, however, the balancing control unit 122 determines the absence of at least one presence signal 124 (thereby indicating loss of communication with a sensor 108 that is configured to output the presence signal), the balancing control unit 122 determines that the fan blade 106 (or portion thereof, such as the airfoil portion 106b) associated with the sensor 108 that is configured to output the presence signal 124 is no longer present (that is, a fan blade out event). Accordingly, the balancing control unit 122 outputs the activation signal 126 to the electromagnet 118 associated with the missing fan blade 106 (or portion thereof, such as the airfoil portion 106b). The activation signal 126 activates the electromagnet 118 associated with the missing fan blade 106 (or portion thereof, such as the airfoil portion 106b). Upon activation, the electromagnet 118 attracts the magnetic particles 116 to the radial location of the activated electromagnet 118. As such, the magnetic particles 116 are drawn to the radial location of the activated electromagnet 118. Because the mass of the magnetic particles 116 equals the mass of the missing fan blade 106 (or portion thereof, such as the airfoil portion 106b) associated with the activated electromagnet 118, the mass of the magnetic particles 116 replaces the missing mass of the fan blade 106 (or portion thereof, such as the airfoil portion 106b), thereby maintaining balance of mass within the engine 102.

Further, the mass of the magnetic particles 116 may be greater than a mass of one fan blade 106, or portion thereof, such as the airfoil portion 106b. In such an embodiment, if multiple airfoil portions 106b are missing, or a portion thereof, the balancing control unit 122 outputs the activation signals 126, which controls current to the electromagnets 118 to control magnetic attraction of the magnetic particles 116. As such, masses of the magnetic particles 116 may be controlled to be drawn to the locations of the missing airfoil portions 106b and/or portions thereof.

As described, the balancing system 100 for the engine 102 of the aircraft 104 includes the housing 110 retaining the magnetorheological fluid 112 including the magnetic particles 116 within the carrier fluid 114. The electromagnets 118 are coupled to the housing 110 (such as exterior portion thereof). The electromagnets 118 are associated with the fan blades 106 of the engine 102. For example, each electromagnet 118 is radially aligned with an associated fan blade 106. The radial alignment is maintained by the housing 110 rotating along with the fan blades 106. The balancing control unit 122 is in communication with the electromagnets 118 and the sensors 108 of the fan blades 106, such as via wireless coupling. In at least one embodiment, the balancing control unit 122 is configured to receive the presence signals 124 from the sensors 108 of the fan blades 106, maintain the electromagnets 118 in deactivated states when the presence signals 124 from the sensors 108 of all the fan blades 106 are detected and accounted for, activate one or more of the electromagnets 118 when one or more of the presence signals 124 are not detected. Accordingly, the electromagnet(s) 118 attract(s) the magnetic particles 116 to compensate for missing mass of at least one of the airfoil portions 106b of the fan blades 106.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the balancing control unit 122 may be or include one or more processors that are configured to control operation thereof, as described herein.

The balancing control unit 122 is configured to execute a set of instructions that are stored in one or more data storage units or elements (such as one or more memories), in order to process data. For example, the balancing control unit 122 may include or be coupled to one or more memories. The data storage units may also store data or other information as desired or needed. The data storage units may be in the form of an information source or a physical memory element within a processing machine.

The set of instructions may include various commands that instruct the balancing control unit 122 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the balancing control unit 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the balancing control unit 122 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
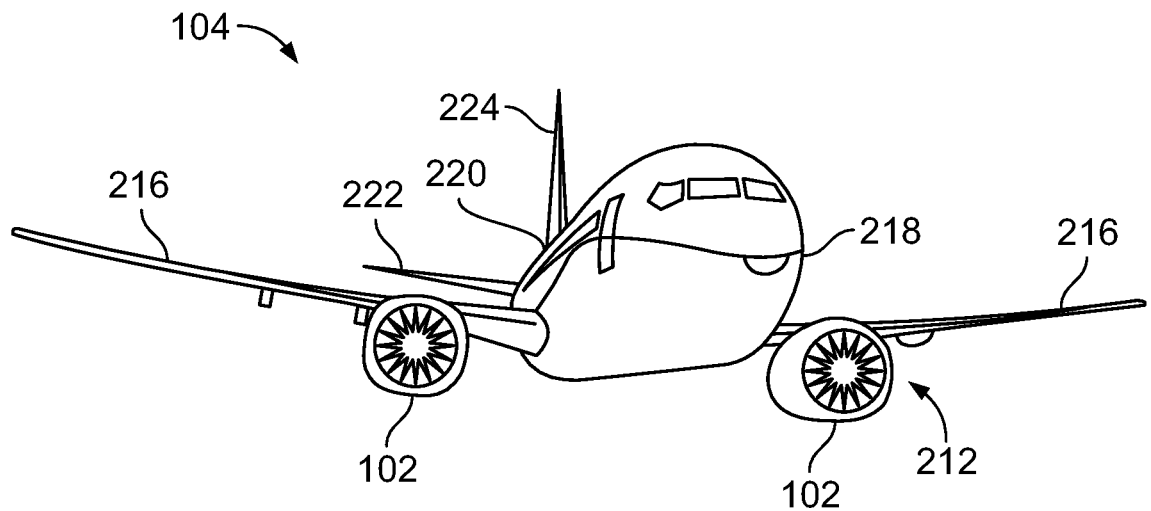
FIG. 2 illustrates a front perspective view of an aircraft, according to an exemplary embodiment of the present disclosure.

FIG. 2 illustrates a front perspective view of the aircraft 104, according to an exemplary embodiment of the present disclosure. The aircraft 104 includes a propulsion system 212 that includes two engines 102, for example. Optionally, the propulsion system 212 may include more engines 102 than shown. The engines 102 are carried by wings 216 of the aircraft 104. In other embodiments, the engines 102 are carried by a fuselage 218 and/or an empennage 220. The empennage 220 may also support horizontal stabilizers 222 and a vertical stabilizer 224. The fuselage 218 of the aircraft 104 defines an internal cabin, including a flight deck.

Figure 3:
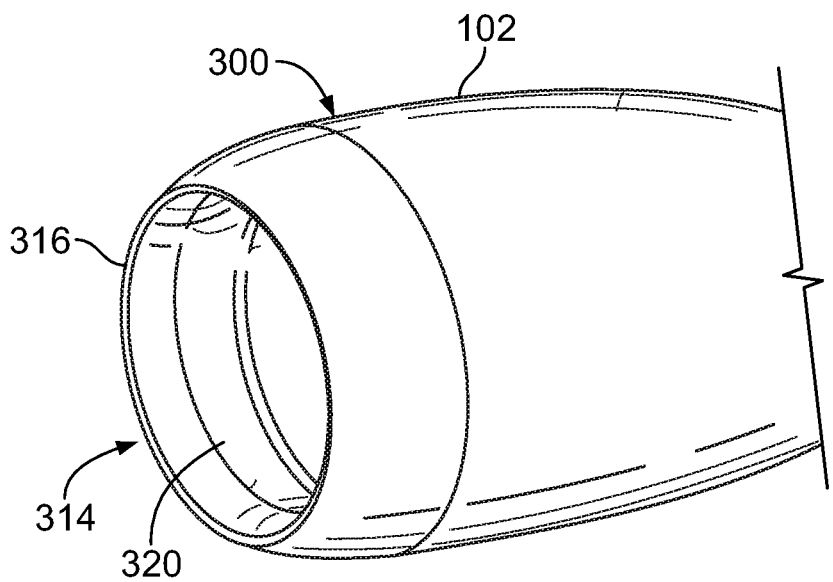
FIG. 3 illustrates a lateral perspective view of an engine, according to an embodiment of the present disclosure.

FIG. 3 illustrates a lateral perspective view of an engine 102, according to an embodiment of the present disclosure. In at least one embodiment, the engine 102 is a gas turbine engine having a case 300 that includes an engine inlet 314. The engine inlet 314 may include a leading edge 316 and an inner barrel section 320 located aft of the leading edge 316 of the engine inlet 314. The inner barrel section 320 may provide a boundary surface or wall for directing airflow (not shown) entering the engine inlet 314 and passing through the engine 102. The inner barrel section 320 may be located in relatively close proximity to one or more fan blades (not shown in FIG. 3). In this regard, the inner barrel section 320 may also be configured to serve as an acoustic structure having a plurality of perforations in an inner face sheet of the inner barrel section 320 for absorbing noise generated by the rotating fan blades and/or noise generated by the airflow entering the engine inlet 314 and passing through the engine 102.

Figure 4:
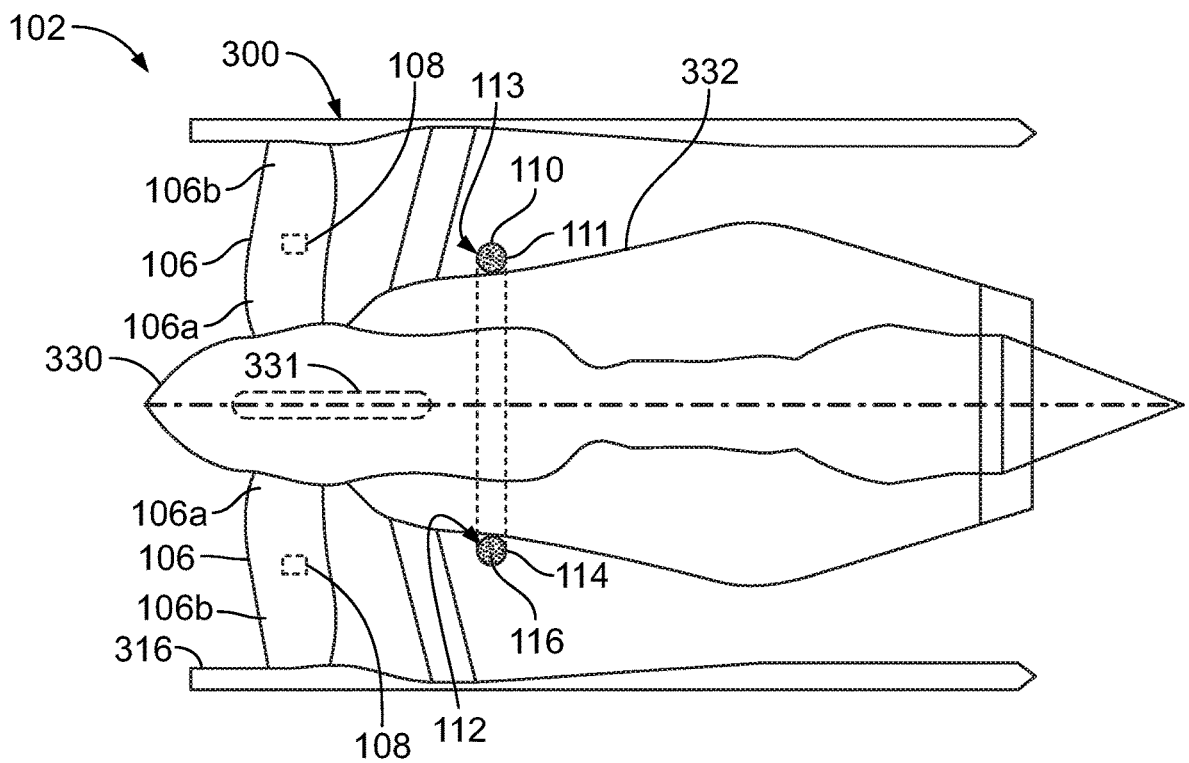
FIG. 4 illustrates a transverse cross-sectional view of the engine, according to an embodiment of the present disclosure.

FIG. 4 illustrates a transverse cross-sectional view of the engine 102, according to an embodiment of the present disclosure. The engine 102 includes the fan blades 106 coupled to an engine core 330. Each fan blade 106 includes a dovetail 106a and an airfoil 106b that is formed unitarily with the dovetail portion 106a. Each fan blade 106 further includes a sensor 108, that in the exemplary embodiment, is coupled to, or embedded within, the airfoil 106b. A shroud or inner wall 332 is positioned around the engine core 330.

As shown, in at least one embodiment, the housing 110 is secured around the exterior of the inner wall 332. This particular location allows for a low weight compact device design, while protecting the device from the ejected fan blade airfoil. However, it should be realized that this is an exemplary embodiment, and that the device can be placed anywhere on the engine, as long as the device has same rotational axis as the fan blades. The housing 110 is formed as a torus 111 that defines an interior tubular chamber 113 that retains the magnetorheological fluid 112. As described with respect to FIG. 1, the housing 110 rotates at the same angular velocity as the fan blades 106, such as via the actuator 120 (shown in FIG. 1). In at least one embodiment, the actuator 120 includes a separate and distinct electric motor 121 operatively coupled to the housing 110. In at least one other embodiment, the actuator 120 may be the engine core 330, which may be coupled to the housing 110 through, for example, a drive shaft coupled to the accessory gearbox using one or more connecting linkages. As another example, the actuator 120 may be one or more linkages that connect the housing 110 to the fan rotor shaft 331.

Figure 5:
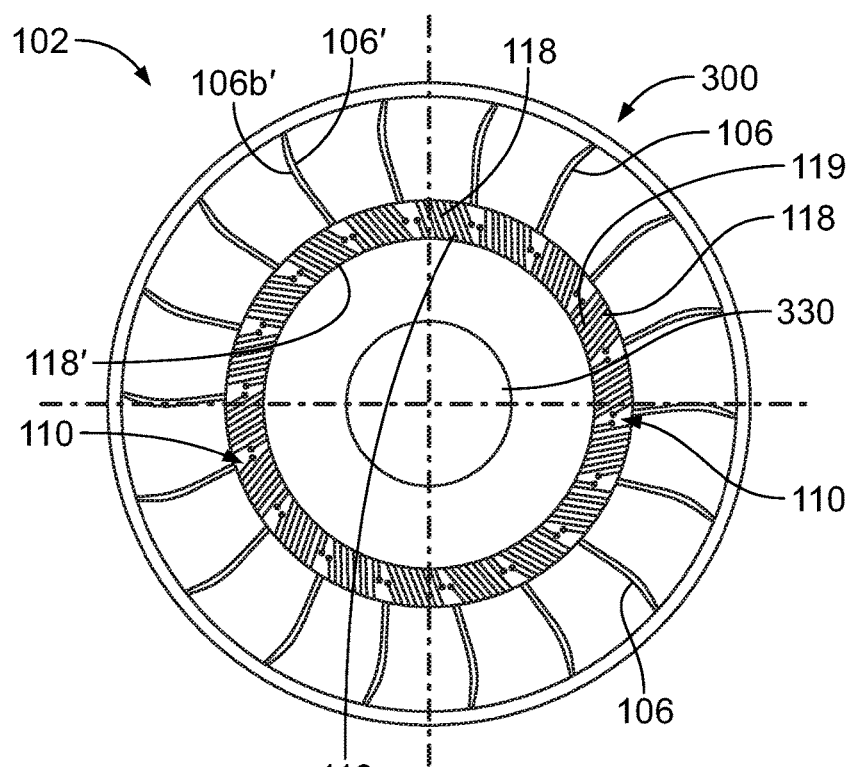
FIG. 5 illustrates a rear view of the engine, according to an embodiment of the present disclosure.

FIG. 5 illustrates a rear view of the engine 102, according to an embodiment of the present disclosure. In at least one embodiment, the electromagnets 118 include coils 119 wrapped around an outer portion of the housing 110. Each electromagnet 118 is radially aligned with and corresponds to an associated fan blade 106.

Referring to FIGS. 1 and 5, in the event the balancing control unit 122 no longer detects a presence signal 124 from a sensor 108 of the fan blade 106', the balancing control unit 122 outputs an activation signal 126 to the electromagnet 118' associated with the fan blade 106' (determined as missing). The activation signal 126 activates the electromagnet 118, such as through electric current. As the electromagnet 118 is activated, the magnetic particles 116 of the magnetorheological fluid 112 are attracted and drawn to the electromagnet 118, thereby providing mass equal to the missing airfoil portion 106b' of a fan blade 106' at the radial position of the missing fan blade 106'. In this manner, the balancing system 100 ensures mass balance within the engine 102.

Figure 6:
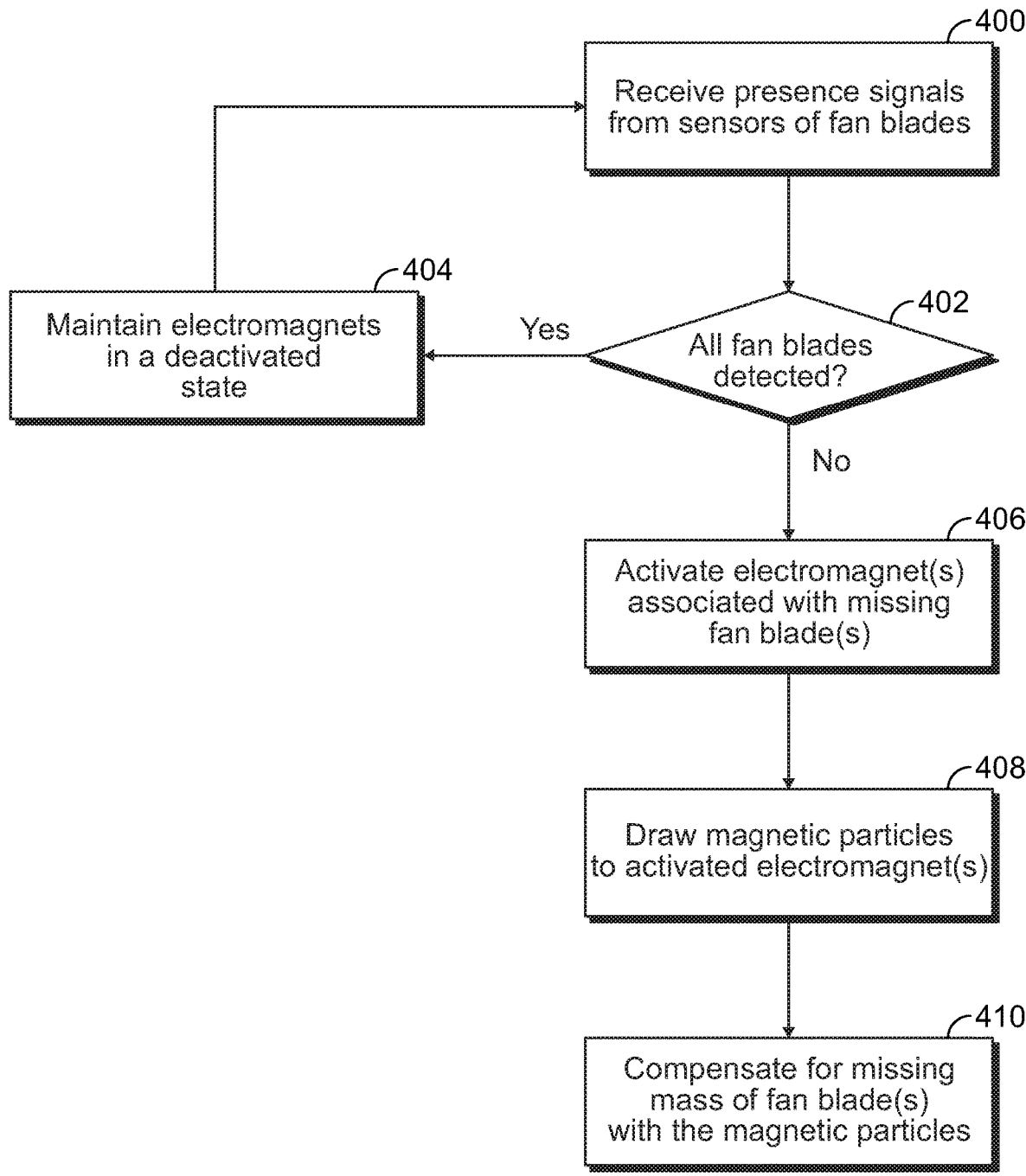
FIG. 6 is a flow chart of a balancing method for an engine of an aircraft, according to an embodiment of the present disclosure.

FIG. 6 is a flow chart of a balancing method for an engine of an aircraft, according to an embodiment of the present disclosure. Referring to FIGS. 1 and 6, at 400, the balancing control unit 122 receives the presence signals 124 from the sensors 108 of the fan blades 106.

At 402, the balancing control unit 122 determines if all the fan blades 106 are detected. For example, if presence signals 124 are received from all of the sensors 108 of the fan blades 106, the balancing control unit 122 determines that all the fan blades 106 are detected, and are therefore present within the engine 102. If all the fan blades 106 are detected at 402, the method proceeds to 404, in which the balancing control unit 122 maintains the electromagnets 118 in a deactivated state.

If, however, all the fan blades 106 are not detected at 402, the method proceeds to 406, at which the balancing control unit 122 activates the electromagnet(s) 118 associated with the missing fan blade(s) 106. Consequently, at 408, the magnetic particles 116 of the magnetorheological fluid 112 within the housing 110 are drawn to the activated electromagnet(s) 118, thereby compensating, at 410, for the missing mass of the fan blade(s) 106.

As described herein, embodiments of the present disclosure provide systems and methods for maintaining mass balance within an engine of an aircraft. Further, embodiments of the present disclosure provide systems and methods for maintaining engine balance in the event a fan blade fragments during operation of the engine.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A balancing system for an engine of an aircraft, the balancing system comprising:
    a housing retaining a magnetorheological fluid including magnetic particles within a carrier fluid;
    electromagnets coupled to the housing, wherein the electromagnets are associated with fan blades of the engine; and
    a balancing control unit in communication with the electromagnets, wherein the balancing control unit is configured to:
        receive presence signals from sensors of the fan blades,
        maintain the electromagnets in deactivated states when the presence signals from the sensors of all the fan blades are detected, and
        activate one or more of the electromagnets when one or more of the presence signals are not detected, wherein the one or more electromagnets that are activated attract the magnetic particles to compensate for missing mass of at least one of the fan blades.

2. The balancing system of claim 1, wherein the housing is formed as a torus defining an interior tubular chamber that retains the magnetorheological fluid.

3. The balancing system of claim 1, wherein a mass of the magnetic particles is equal to a mass of at least one of the fan blades.

4. The balancing system of claim 1, wherein a number of electromagnets corresponds to a number of the fan blades.

5. The balancing system of claim 1, wherein the electromagnets are radially aligned with the fan blades, and wherein each of the electromagnets is radially aligned with a respective one of the fan blades.

6. The balancing system of claim 5, wherein the housing is configured to rotate at the same angular velocity as the fan blades so that a radial alignment between the fan blades and the electromagnets is maintained.

7. The balancing system of claim 6, further comprising an actuator operatively coupled to the housing, wherein the actuator rotates the housing.

8. The balancing system of claim 7, wherein the actuator comprises an electric motor.

9. A balancing method for an engine of an aircraft, the balancing method comprising:
    retaining, within a housing, a magnetorheological fluid including magnetic particles within a carrier fluid;
    coupling electromagnets to the housing;
    associating the electromagnets with fan blades of the engine; and
    communicatively coupling a balancing control unit with the electromagnets; and
    receiving, by the balancing control unit, presence signals from sensors of the fan blades;
    maintaining the electromagnets in deactivated states when the presence signals from the sensors of all the fan blades are detected;
    activating one or more of the electromagnets when one or more of the presence signals are not detected; and
    attracting, by the one or more electromagnets that are activated, the magnetic particles to compensate for missing mass of at least one of the fan blades.

10. The balancing method of claim 9, further comprising forming the housing as a torus defining an interior tubular chamber that retains the magnetorheological fluid.

11. The balancing method of claim 9, wherein a mass of the magnetic particles is equal to a mass of at least one of the fan blades.

12. The balancing method of claim 9, wherein a number of electromagnets corresponds to a number of the fan blades.

13. The balancing method of claim 9, wherein said associating comprises radially aligning the electromagnets with the fan blades, and wherein each of the electromagnets is radially aligned with a respective one of the fan blades.

14. The balancing method of claim 13, further comprising rotating the housing at the same angular velocity as the fan blades so that a radial alignment between the fan blades and the electromagnets is maintained.

15. The balancing method of claim 14, further comprising operatively coupling an actuator to the housing, wherein said rotating is by the actuator.

16. An aircraft comprising:
    an engine including fan blades, wherein each of the fan blades includes a sensor; and
    a balancing system comprising:
        a housing retaining a magnetorheological fluid including magnetic particles within a carrier fluid, wherein the housing is formed as a torus defining an interior tubular chamber that retains the magnetorheological fluid, wherein a mass of the magnetic particles is equal to a mass of at least one of the fan blades;
        electromagnets coupled to the housing, wherein the electromagnets are associated with the fan blades of the engine, wherein a number of electromagnets corresponds to a number of the fan blades, wherein the electromagnets are radially aligned with the fan blades, and wherein each of the electromagnets is radially aligned with a respective one of the fan blades, wherein the housing is configured to rotate at the same angular velocity as the fan blades so that a radial alignment between the fan blades and the electromagnets is maintained; and
        a balancing control unit in communication with the electromagnets and the sensor of each of the fan blades.

17. The aircraft of claim 16, wherein the balancing control unit is configured to:
  receive a presence signal from the sensor of each of the fan blades,
  maintain the electromagnets in deactivated states when the presence signal from the sensor of each of the fan blades is detected, and
  activate one or more of the electromagnets when the presence signal from the sensor at least one of the fan blades is not detected, wherein the one or more electromagnets that are activated attract the magnetic particles to compensate for missing mass of at least one of the fan blades.

18. The aircraft of claim 16, further comprising an actuator operatively coupled to the housing, wherein the actuator rotates the housing.

19. A balancing system for an engine of an aircraft, the balancing system comprising:
  a housing retaining a magnetorheological fluid including magnetic particles within a carrier fluid;
  electromagnets coupled to the housing, wherein the electromagnets are associated with fan blades of the engine, wherein a mass of the magnetic particles is equal to a mass of at least one of the fan blades; and
  a balancing control unit in communication with the electromagnets.

20. A balancing system for an engine of an aircraft, the balancing system comprising:
  a housing retaining a magnetorheological fluid including magnetic particles within a carrier fluid;
  electromagnets coupled to the housing, wherein the electromagnets are associated with fan blades of the engine, wherein a number of electromagnets corresponds to a number of the fan blades; and
  a balancing control unit in communication with the electromagnets.

21. A balancing system for an engine of an aircraft, the balancing system comprising:
  a housing retaining a magnetorheological fluid including magnetic particles within a carrier fluid;
  electromagnets coupled to the housing, wherein the electromagnets are associated with fan blades of the engine, wherein the electromagnets are radially aligned with the fan blades, and wherein each of the electromagnets is radially aligned with a respective one of the fan blades, wherein the housing is configured to rotate at the same angular velocity as the fan blades so that a radial alignment between the fan blades and the electromagnets is maintained;
  an actuator operatively coupled to the housing, wherein the actuator rotates the housing; and
  a balancing control unit in communication with the electromagnets.

22. The balancing system of claim 21, wherein the actuator comprises an electric motor.

23. A balancing method for an engine of an aircraft, the balancing method comprising:
  retaining, within a housing, a magnetorheological fluid including magnetic particles within a carrier fluid;
  coupling electromagnets to the housing;
  associating the electromagnets with fan blades of the engine, wherein a mass of the magnetic particles is equal to a mass of at least one of the fan blades; and
  communicatively coupling a balancing control unit with the electromagnets.

24. A balancing method for an engine of an aircraft, the balancing method comprising:
  retaining, within a housing, a magnetorheological fluid including magnetic particles within a carrier fluid;
  coupling electromagnets to the housing;
  associating the electromagnets with fan blades of the engine, wherein a number of electromagnets corresponds to a number of the fan blades; and
  communicatively coupling a balancing control unit with the electromagnets.

25. A balancing method for an engine of an aircraft, the balancing method comprising:
  retaining, within a housing, a magnetorheological fluid including magnetic particles within a carrier fluid;
  coupling electromagnets to the housing;
  associating the electromagnets with fan blades of the engine, wherein said associating comprises radially aligning the electromagnets with the fan blades, and wherein each of the electromagnets is radially aligned with a respective one of the fan blades;
  communicatively coupling a balancing control unit with the electromagnets;
  operatively coupling an actuator to the housing,
  rotating the housing at the same angular velocity as the fan blades so that a radial alignment between the fan blades and the electromagnets is maintained; and
  wherein said rotating is by the actuator.

\* \* \* \* \*